April 30, 1929. F. R. KLAUS 1,710,930
PROCESS OF FORMING ANNULAR FLANGES
Filed Aug. 13, 1924
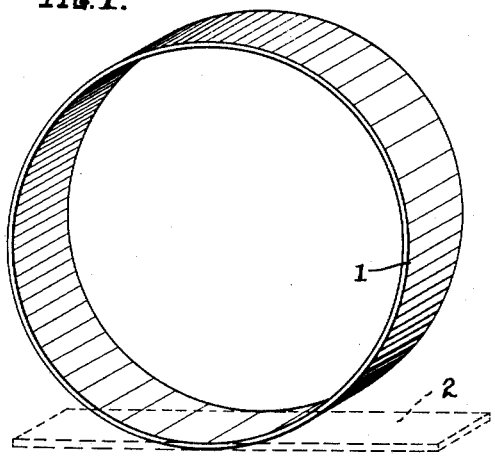
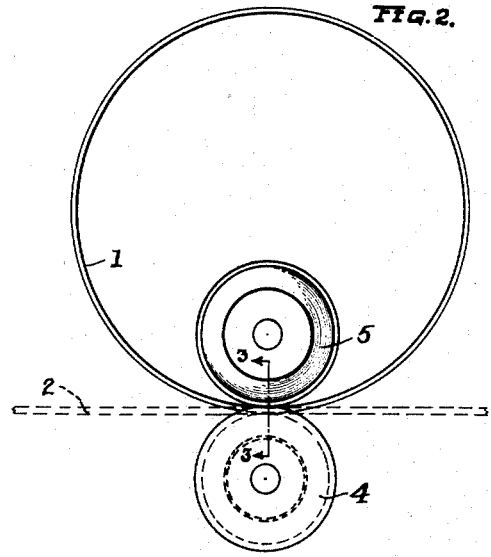
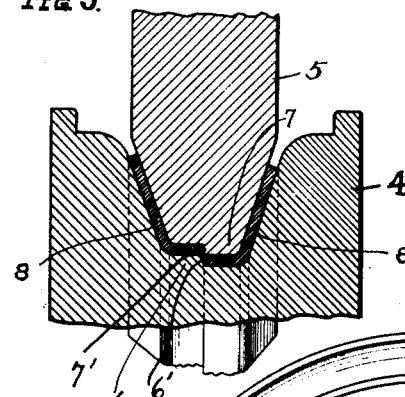
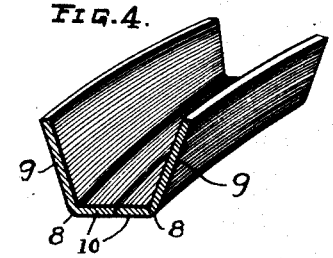
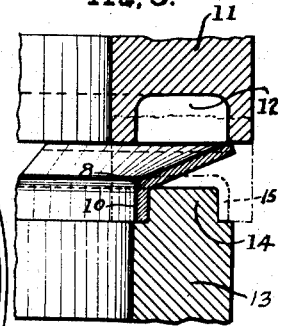
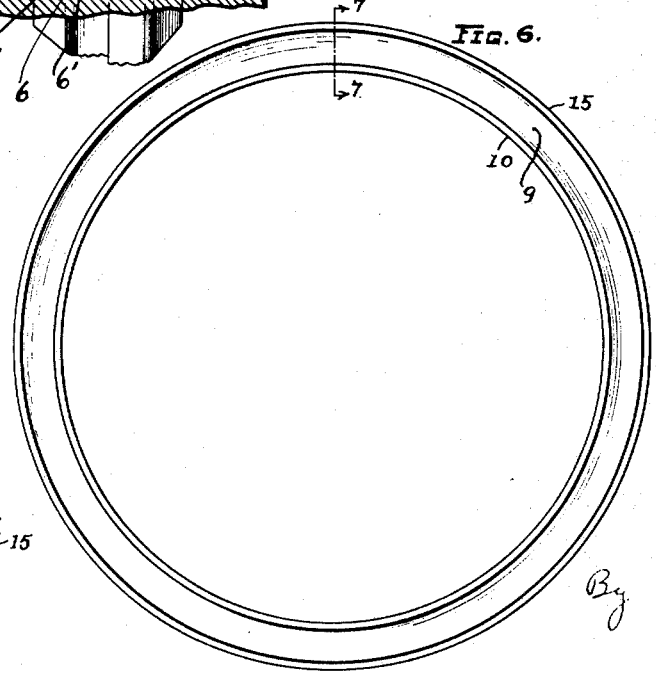
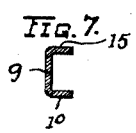
Inventor
F. R. Klaus
By Lloyd L. Evans
Attorney Patented Apr. 30, 1929.

1,710,930

UNITED STATES PATENT OFFICE.

FRED R. KLAUS, OF WARREN, OHIO, ASSIGNOR TO THE AMERICAN WELDING AND MANUFACTURING COMPANY, OF WARREN, OHIO, A CORPORATION OF OHIO.

PROCESS OF FORMING ANNULAR FLANGES.

Application filed August 13, 1924. Serial No. 731,859.

This invention relates to a method of forming annular plates from annular bands, and more particularly to a method by which annular plates having their body portions substantially normal to the axis and also having one or more flanges substantially parallel to the axis may be formed from annular, cylindrical bands.

An object of the present invention is to provide a relatively simple and efficient method for cold rolling and shaping annular bands to form annular plates and the like.

Another object of the invention is to provide a process by which a plurality of members to form annular plates may be rolled from the same annular band and each of these members subsequently shaped to form annular plates of the desired shape and contour.

With the above and other objects in view the invention may be said to comprise the method as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification in which:

Figure 1 is a perspective view of the cylindrical band which is made from a flat bar and from which the annular plates are formed.

Fig. 2 is a side elevation showing an annular band in place between a pair of shaping rolls.

Fig. 3 is a transverse section through the shaping rolls taken on line 3—3 of Fig. 2.

Fig. 4 is a fragmentary view of a portion of a rolled band divided along a central plane.

Fig. 5 is a section through the shaping dies.

Fig. 6 is a side elevation of the finished band.

Fig. 7 is a section on line 7—7 Fig. 6.

In the accompanying drawing is shown by way of example a process of making annular plates which have their body portions substantially normal to the axis and which have flanges projecting from the body portion substantially parallel to the axis, thus virtually forming an annular member, channel shaped in cross section, with the channel opening at the side, as will be seen in Figures 6 and 7.

Figure 1 shows the annular, cylindrical band 1 which may be formed by bending a flat strip 2 (shown in dotted lines in Fig. 1) into cylindrical form and welding the free ends together as is common practice in the art.

The present invention provides a simple method by which annular plates, of such cross section shapes that they cannot be readily formed by bending a straight bar of the same cross section, may be formed from such an annular cylindrical band.

In carrying out the method of the present invention the band 1 is placed between a pair of shaping rolls 4 and 5 which are pressed one toward the other and gradually approach each other as the transverse sectional shape of the band gradually conforms to the peripheral configuration of the rolls. The roll 4 is a wide roll having a peripheral channel with inclined side walls against which the inner face of the band 1 is forced by the narrow roll 5, the cross sectional shape of the periphery of the roll 5 being the complement of that of the roll 4 so that when the rolls have completed their operation on the band 1 the band will have been bent into a form such as shown in Figs. 3 or 4 so that it fits within the groove in the roll 4 and the roll 5 fits within the external channel of the band.

In case it is desired to sever the band in the rolling operation the rolls 4 and 5 are also so shaped that the band is divided in a suitable plane such as midway between the side edges thereof during the shaping operation. This may be accomplished by offsetting the two halves of each roll on opposite sides of the central plane thereof by forming the same of different diameters. The roll 4 has the peripheral groove 6 deeper on one side to form a right angled shoulder 6' in the central plane and the roll 5 has a peripheral forming portion 7 which cooperates with the deeper half 6 of the groove. This portion 7 is of larger diameter than the portion which cooperates with the shallower half of the groove, so that there is formed thereon a peripheral shoulder 7' which cooperates with the shoulder 6' to shear the band along the plane normal to the axis and midway between the edges of the band. The rolls, therefore, form from each band 1 two annular plates of angle form in cross section, the two annular plates so formed being of the same size and shape.

The two annular plates 8 formed by the rolls have a body portion 9 which is inclined at a relative small angle to planes normal to the axis of the annulus and relatively short cylindrical flanges 10, the flanges 10 being the portions formed by the cooperating cylindrical portions of the rolls and the body portions 9 being the flanges bent up from the band 1 by the inclined side portions of the rolls. The annular plate 8 as it comes from the rolls 4 and 5 has its body portion 9 at a slight angle to a plane normal to the axis and its short flange 10 annular and lying parallel to the axis.

If it is desired to further bend the body portion 9 with respect to the flange 10 or to dispose the body portion 9 at right angles to the axis, this may readily be accomplished by pressing the annular plate between annular dies. Such dies are shown in Fig. 5, the dies shown being so formed that a second annular flange 15 is formed outside the flange 10. The annular die 11 has a channel 12 and the die 13 has an annular projection 14 which corresponds in shape to the channel 12, the difference in size between the channel and projection providing a clearance corresponding to the thickness of the metal of the annular plate 8. The plate 8 is placed on the lower die which, as shown in Fig. 5, is the male die 13 and the die 11 is pressed upon the upper face of the plate, drawing the body portion 9 of the plate into a plane normal to the axis of the annulus and simultaneously forming the outer annular flange 15 which is concentric with the flange 10. It is to be understood that either the die 11 or the die 13 may be the lower die, depending upon the conditions and the shape of the plate being formed. Also, the shape of the rolls may be varied and the form of the dies may be varied in accordance with the cross sectional shape of the particular annular plate to be formed.

It will be seen that I have provided a method by which a band sufficiently wide to form a plurality of the finished annular members is rolled from a flat strip and welded and subsequently rolled and divided to form a plurality of the finished articles. By this means it is apparent that a rolling or welding operation is done away with, for in the present methods of manufacture the band for each finished article is separately rolled into a ring and welded. Furthermore, in one operation the band is shaped by rolling to form a plurality of pieces in semi-finished condition, which, when separated from each other, can be formed to the desired shape in one operation.

It will thus be seen that I have provided a relatively simple method for forming from annular bands, annular plates, with one or more flanges projecting therefrom substantially parallel to the axis thereof.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:.

1. The method of forming annular plates which comprises forming an annular band, rolling the band to substantially channel-shape, dividing the channel-shaped annulus between the flanges by radially offsetting one portion relative to the other portion to form a pair of substantially identical sections, and subsequently forming a laterally extending flange along each edge of each section.

2. The method of forming laterally flanged annular plates which comprises forming an endless, annular band, rolling the band to form radially extending spaced flanges, dividing the band between the flanges by radially offsetting one portion relative to the other portion to form a pair of annular sections, and subsequently forming flanges along each edge of each section.

3. The method of forming annular plates which comprises forming an annular band, rolling said band to form relatively wide side flanges extending outwardly from the central portion of the band, and simultaneously dividing said band midway between the side flanges by offsetting one portion relative to the other to provide annular plates having body portions formed by said side flanges and extending at a small angle with respect to planes normal to the axis of said plates and having a relatively short cylindrical flange formed by the intermediate portion of said band.

4. The method of forming annular plates which comprises forming an annular band, simultaneously rolling the band to channel form, and dividing said annular channel during the rolling process by shearing one portion from the other, along a central plane, and bending the annular plates so formed to provide a flange along each edge thereof.

5. The method of forming annular plates which comprises forming an annular band, rolling said band to channel shape, and simultaneously dividing said channel shaped band in a plane midway between the side flanges by offsetting one portion relative to the other portion to form two identical angle shaped annular plates and forming an annular flange along each edge of each annular plate.

6. The method of forming annular plates which comprises forming an annular band, simultaneously rolling said band to form outwardly extending side flanges and cutting said band in two between said side flanges by offsetting one portion thereof relative to the other portion, and simultaneously pressing a laterally extending annular flange on each edge of each severed part and changing the angularity of the body portion of said plates.

7. The method of forming an annular channel-shaped member having its body portion substantially perpendicular to the axis thereof, which comprises forming sheet metal into a flat integral annular band having a body portion substantially parallel to its axis, rolling said band to a channel shape having body portions extending outwardly from the axis thereof and an intermediate flange substantially parallel to said axis, severing said channel-shaped annulus between the body portions thereof to form two annuli, and pressing one of said annuli to form an annular ring having a body portion substantially perpendicular to the axis thereof and a flange portion substantially parallel to said axis.

8. The method of forming an annular ring, which comprises forming a flat annular sheet metal band, rolling said band to form an annulus having a body portion extending outwardly from the axis thereof and a portion substantially parallel to said axis, and pressing said annulus to form a channel-shaped ring having a body portion substantially perpendicular to the axis thereof and end flanges substantially parallel to said axis.

In testimony whereof, I hereunto affix my signature.

FRED R. KLAUS.